United States Patent [19]
Pawlowski et al.

[11] Patent Number: 5,455,957
[45] Date of Patent: Oct. 3, 1995

[54] METHOD AND APPARATUS FOR CONDUCTING BUS TRANSACTIONS BETWEEN TWO CLOCK INDEPENDENT BUS AGENTS OF A COMPUTER SYSTEM USING A TRANSACTION BY TRANSACTION DETERMINISTIC REQUEST/RESPONSE PROTOCOL

[75] Inventors: Stephen Pawlowski, Beaverton; Peter D. MacWilliams, Aloha, both of Oreg.

[73] Assignee: Intel Corporation, Santa Clara, Calif.

[21] Appl. No.: 394,560

[22] Filed: Feb. 27, 1995

Related U.S. Application Data

[63] Continuation of Ser. No. 25,728, Mar. 1, 1993, abandoned, which is a continuation of Ser. No. 827,531, Jan. 29, 1992, abandoned, which is a continuation of Ser. No. 292,476, Dec. 30, 1988, abandoned.

[51] Int. Cl.⁶ .................................................. G06F 13/00
[52] U.S. Cl. ..................... 395/800; 395/427; 395/280; 395/410; 395/296; 395/650; 364/DIG. 1; 364/239.1; 364/238.4; 364/245.4; 364/245
[58] Field of Search ................... 395/800, 325, 395/400, 425

[56] References Cited

U.S. PATENT DOCUMENTS

| | | | |
|---|---|---|---|
| 4,001,790 | 1/1977 | Barlow | 340/172.5 |
| 4,281,392 | 7/1981 | Grants et al. | 364/900 |
| 4,323,967 | 4/1982 | Peters et al. | 364/200 |
| 4,371,928 | 2/1983 | Barlow et al. | 364/200 |
| 4,480,307 | 10/1984 | Budde et al. | 364/200 |
| 4,615,017 | 9/1986 | Finlay | 395/425 |
| 4,740,916 | 4/1988 | Martin | 364/900 |
| 4,742,448 | 3/1988 | Sander et al. | 395/425 |
| 4,744,025 | 5/1988 | Lipcon et al. | 364/200 |
| 4,751,634 | 6/1988 | Burrus, Jr. et al. | 364/200 |
| 4,751,671 | 6/1988 | Babetski et al. | 364/900 |
| 4,787,028 | 11/1988 | Finfrock et al. | 364/200 |
| 4,787,060 | 11/1988 | Boudreau et al. | 364/200 |
| 4,797,815 | 1/1989 | Moore | 364/200 |
| 4,803,621 | 2/1989 | Kelly | 395/400 |
| 4,807,116 | 2/1989 | Katzman et al. | 364/200 |
| 4,847,758 | 7/1989 | Olson et al. | 395/425 |
| 4,855,901 | 8/1989 | Planteline | 364/200 |
| 4,858,038 | 8/1989 | Kazama | 360/69 |
| 4,969,085 | 11/1990 | Desjourdy | 364/200 |
| 4,980,850 | 12/1990 | Morgan | 364/900 |
| 5,079,748 | 1/1990 | Miyatake | 365/233 |
| 5,091,850 | 2/1992 | Culley | 395/400 |

FOREIGN PATENT DOCUMENTS

| | | |
|---|---|---|
| 0800626 | 11/1982 | European Pat. Off. . |
| 0121381 | 3/1984 | European Pat. Off. . |
| 0136178 | 9/1984 | European Pat. Off. . |
| 0285986 | 3/1988 | European Pat. Off. . |
| 2215497 | 9/1988 | United Kingdom . |
| 2204163 | 11/1988 | United Kingdom . |
| 2204163 | 10/1991 | United Kingdom . |

OTHER PUBLICATIONS

Young et al, "Two–Chip Set Tackles Disk Control Problems", *Computer Design* 84 pp. 129–131.
Brumm et al. (1987), Chapters 4, 7, 5, 12, 13 *80386 A Programming and Design Handbook.*
*386 Microprocessor Hardware Reference Manual* (1988), Chapter 6, 1, 9, Intel.
*8208 Dynamic Ram Controller* 3–323—3–337; Intel, Jan. 1985.

*Primary Examiner*—Eric Coleman
*Assistant Examiner*—L. Donaghue
*Attorney, Agent, or Firm*—Blakely, Sokoloff, Taylor & Zafman

[57] ABSTRACT

An apparatus and method for communicating characteristics about a memory module to a processor unit. A method and apparatus for communicating memory module characteristics, such as whether the module can communicate in a deterministic mode, memory size, memory speed, memory type and whether the memory is cachable to a processor. In the present invention, the processor asserts a request signal onto the system bus and the memory module corresponding to the address of the request respond with information regarding its characteristics.

10 Claims, 7 Drawing Sheets

METHOD AND APPARATUS FOR CONDUCTING BUS TRANSACTIONS BETWEEN TWO CLOCK INDEPENDENT BUS AGENTS OF A COMPUTER SYSTEM USING A TRANSACTION BY TRANSACTION DETERMINISTIC REQUEST/RESPONSE PROTOCOL

This is a continuation of application Ser. No. 08/025,728, filed Mar. 1, 1993 now abandoned, which is a continuation of application Ser. No. 07/827,531, filed Jan. 29, 1992 now abandoned, which is a continuation of application Ser. No. 07/292,476, filed Dec. 30, 1988 now abandoned.

BACKGROUND OF THE INVENTION

1. Field of the Invention

The present invention relates to the field of bus protocols in computer systems and, more specifically, to methods and circuitry for requesting and responding to requests over a bus.

2. Prior Art

Many known computer systems comprise a plurality of modules such as processor modules, memory modules, etc., which communicate over a bus system. Typically, the modules may be under control of a common or synchronized clock signal. Generally such a configuration provides a CPU clock signal on the bus. Individual modules generate signals on the bus synchronous to the CPU clock signal.

A timing relationship is predetermined during the design of the various modules. Modules, such as the processing unit, may then be designed to add a fixed number of wait states to their access cycles to accommodate slower modules.

Such a system design may require changes to the individual modules if the CPU clock speed is increased.

Therefore, as one objective of the present invention it is desired to develop a system architecture and bus protocol which allows CPU clock speed to be changed without affecting other modules in the system.

In computer systems, it is further necessary to provide certain configuration information about certain modules to other modules in the system. For example, the processor module may require information regarding the speed of a certain memory module, the type of memory access mode the memory module is capable of supporting (e.g. static column, fast page, burst, etc.), the page size used on dynamic random access memory (DRAM) chips, etc.

Therefore, as a second objective of the present invention it is desired to develop a computer system having a protocol for supporting a variety of module configurations; the protocol allowing for communication of such configuration information between modules in the system.

Known computer systems further typically may utilize a plurality of configuration or "dip" switches. The switches are utilized to provide information to the processor unit regarding the configuration of installed modules. For example, a particular system may be configured with a first memory board having four megabytes of memory and a second memory board having an additional eight megabytes of memory. In this configuration, configuration switches, either on the main system board (motherboard or baseboard) or on the individual add-on modules may be set to indicate four megabytes of memory are installed on the first memory board and eight megabytes of memory are installed on the second memory board.

In such systems, address decode logic may be employed on each memory board in the system. Based on the setting of the configuration switches in the examplary system described above, address decode logic may be employed such that the first board addresses memory in system memory space from memory address 0 to memory address 4M −1 and the second board addresses memory in the system memory space from memory address 4M to memory address 12M −1.

It is a third object of the present invention to develop a computer system allowing for communication of information regarding installed memory address space without the requirement of complex user settable configuration switches.

As a fourth object of the present invention it is desired to develop a computer system which does not require separate address decode logic on each memory module in the system.

These and other objects of the present invention will be described in more detail with reference to the detailed description of the present invention and the accompanying drawings.

SUMMARY OF THE INVENTION

The present invention discloses a method and apparatus for communicating memory module characteristics to a processor or other apparatus requesting access to the memory module. The present invention comprises a computer system system having at least one processor or other requestor which requests access to a memory. The computer system further has at least one memory which may be accessed by the requestor. The memory and processor are electrically coupled by a communication system, preferably a system bus for communicating address, data and control information between the memory and processor.

The memory modules may have varying characteristics depending on the particular computer system configuration. For example, one memory module may be capable of deterministic communication with the processor while another module may only be capable of asynchronous communication. Other characteristics of the various memory modules of the preferred embodiment are described with reference to the Detailed Description of the Present Invention and the accompanying drawings.

It will be obvious that these particular characteristics are not to be read as limiting the present invention, but, rather are exemplary of the methods and apparatus employed by the present invention for allowing a processor to request characteristic information from a memory module. The memory module provides the characteristic information to the processor responsive to the request. The processor is then able to configure its communication with the memory module based on the provided characteristics.

BRIEF DESCRIPTION OF THE DRAWINGS

FIG. 3 (b) ms a timing diagram illustrating a bus master exchange protocol as may be utilized by the present invention.

FIG. 3 (c) is a timing diagram illustrating a preemption arbitration protocol as may be utilized by the present invention.

FIG. 4 (b) is a timing diagram illustrating an asynchronous read cycle as may be utilized by the present invention.

FIG. 4 (c) ms a timing diagram illustrating a deterministic write cycle as may be utilized by the present invention.

FIG. 4 (d) is a timing diagram illustrating an asynchronous write cycle as may be utilized by the present invention.

FIG. 4 (e) is a timing diagram illustrating a fast paged mode operation (read or write) and static column mode write operation as may be utilized by the present invention.

FIG. 4 (f) is a timing diagram illustrating a static column mode read operation as may be utilized by the present invention.

DETAILED DESCRIPTION OF THE INVENTION

Figure 1:
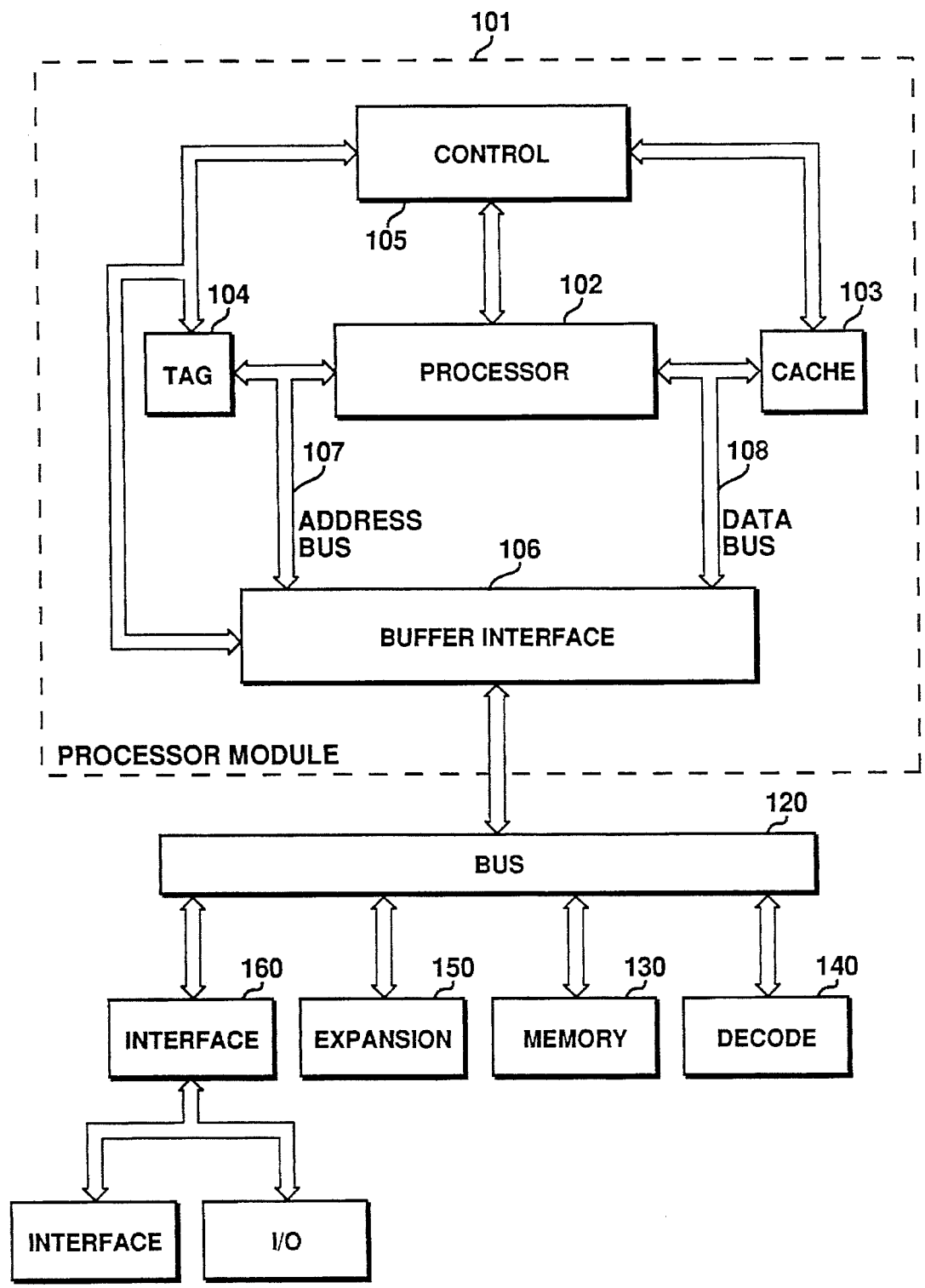
FIG. 1 is a block diagram illustrating a computer system as may be utilized by the present invention.

A method and circuitry for identification of memory module size and assignment of system memory address space is described. In the following description, numerous specific details are set forth such as signal names, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

The present invention relates to a computer system architecture and bus protocol which allows for communication of certain configuration information regarding individual modules in the computer system over the system bus. The preferred embodiment of the present invention teaches providing a first plurality of configuration information on the system bus regarding memory size for each individual memory module at system power-up-time. A second plurality of configuration information is provided by the individual modules in response to any request for service by those modules.

Utilizing the circuitry and protocol of the present invention, increased CPU clock speeds may be supported without requiring changes to the design of other existing modules in the system.

Further, memory may be assigned to system memory address space without requirement for "dip" switches being set to identify memory module size. Further, address decode logic may be centrally located within the computer system and does not have to be duplicated on each memory module.

COMPUTER SYSTEM OVERVIEW

General System Description

The present invention discloses a method of "decoupling" the processor of a modern computer system from the other modules of the computer system. The processor's internal clock speed is independent of the clock speeds of other modules of the computer system.

It is known in modern computer system to allow modules, such as processors and memories, to operate asynchronously of each other. However, in such computer systems, a penalty is associated with any communication between the independent blocks. The "penalty" may be measured by the lost time or wait states imposed by synchronizing a signal incoming to a module with the clock speed of the module.

The present invention discloses operating the processor and other modules in an asynchronous modes while avoiding synchronization penalties of known computer systems.

Generally, the present invention discloses a processor (or other bus master) making a request to memory (or other resource such as I/O) over a bus. At the time the request is initiated by the processor, the memory responds to the request with information on its type, speed and mode of operation if the memory can be accessed in a deterministic manner.

The processor then determines waits the appropriate number of clock cycles (the number of clock cycles is determined based on information returned from the module) and reads data from the bus. If the memory responds that it may not be accessed in a deterministic manner (i.e., it must be accessed asynchronously), the processor and memory communicate in an asynchronous manner with the inherent asynchronous penalties.

The present invention, in its preferred embodiment, supports a 32-bit bus architecture that complements the standard IBM compatible PC/AT interface. The bus is primarily used as a memory bus; however, it is capable of supporting multiple bus masters and I/O systems. This allows the present invention to be utilized in future embodiments having co-processors requiring high bus bandwidth.

Block Diagram of the Preferred Embodiment

A block diagram of a computer system of the presently preferred embodiment of the present invention is illustrated with reference to FIG. 1. A processor module 101 comprises a processor 102 having a cache memory 103 with its associated address tag buffer 104 and control circuitry 105. The processor 102 and address tag buffer 104 are coupled with buffer interface 106 through an address bus 107. The processor 102, along with the cache memory 103, is further coupled to the buffer interface 106 through a data bus 108.

The processor module 101 is coupled to the system bus 120 through the buffer interface 106. As stated previously, future embodiments of the present invention may comprise a plurality of coprocessors coupled with the system bus 120. The processor module 101 may access a memory, such as memory 130 over system bus 120.

As will be described in more detail with reference to FIG. 2, memory of the computer system of the present invention is configured (that is, memory modules will be assigned addresses in system memory address space) at the time the computer system is powered up. The preferred embodiment of the present invention comprises an address decode module 140 coupled with system bus 120 for configuring system memory. Each memory module in the system presents configuration information to the address decode module 140 at system power-up time.

A plurality of expansion slots, such as expansion slot 150, are coupled with the system bus 120. Additional memory or other resources may be plugged into these expansion slots and may communicate with processor module 101 over the system bus 120.

I/O modules or other resources may be coupled to the system bus 120 through interface 160 and are allowed to communicate with processor module 101 over the system bus 120.

Signal Naming Conventions

Figure 2:
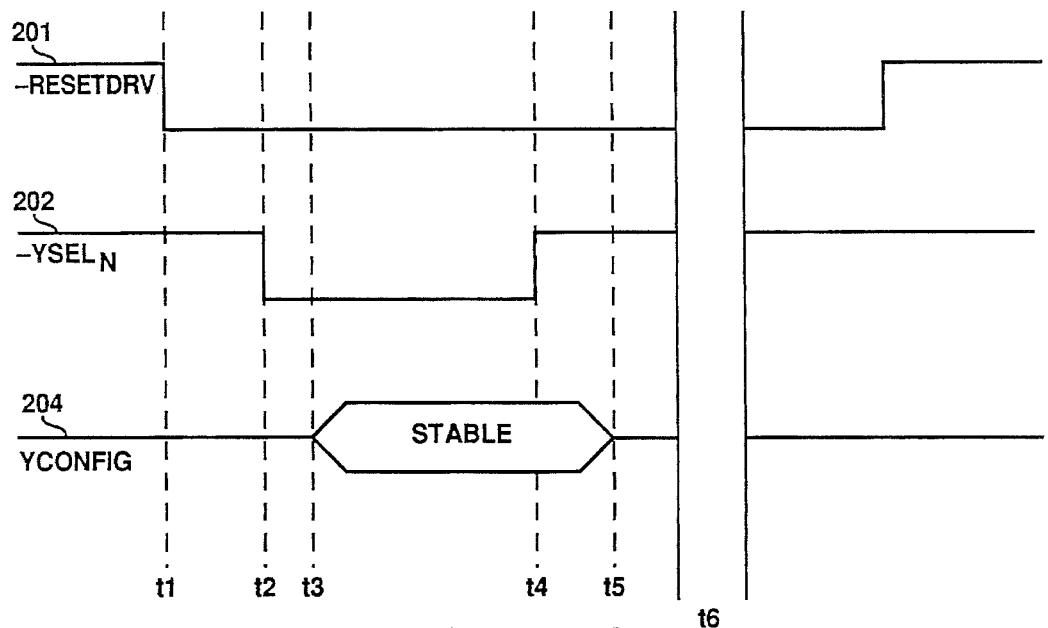
FIG. 2 is a timing diagram illustrating start-up memory identification signals as may be utilized by the present invention.
Figure 3A:
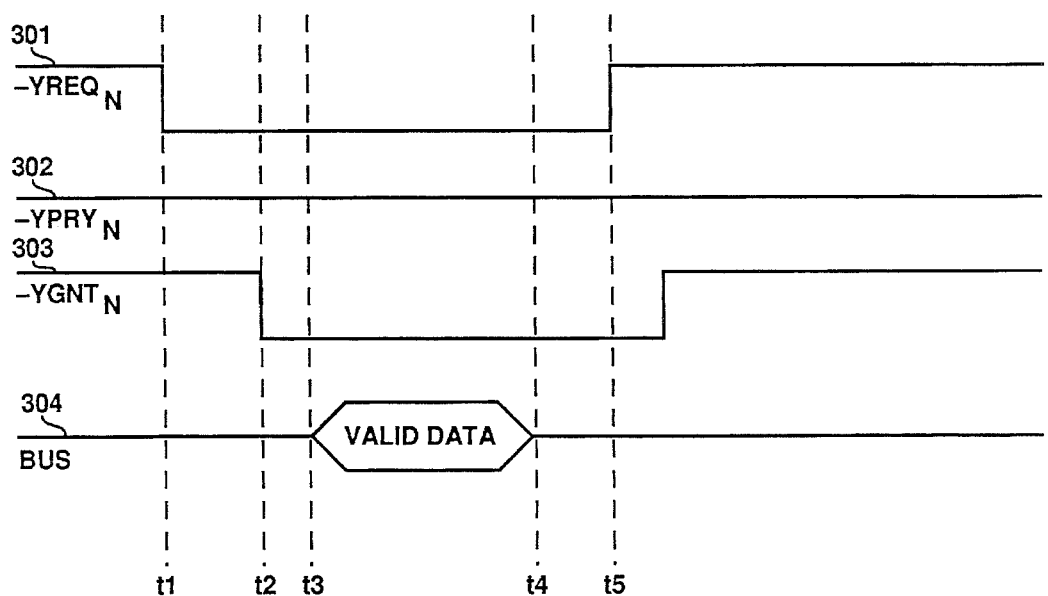
FIG. 3 (a) ms a timing diagram illustrating a arbitration protocol as may be utilized by the present invention.
Figure 3B:
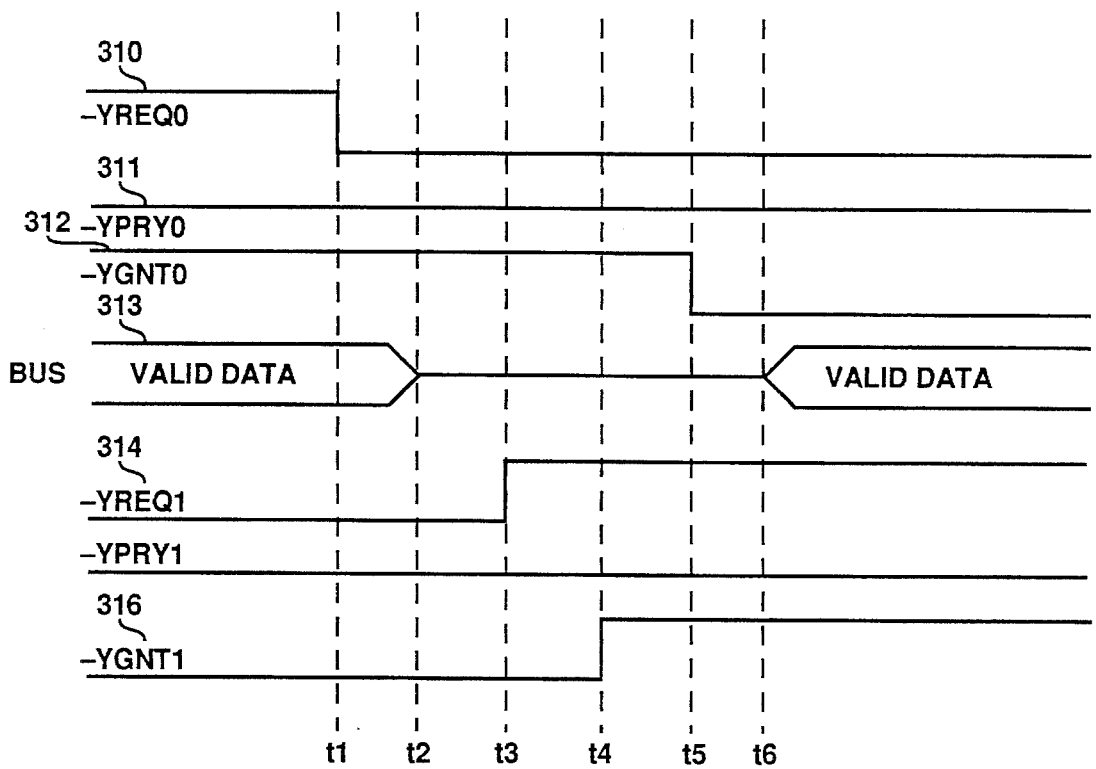
Figure 3C:
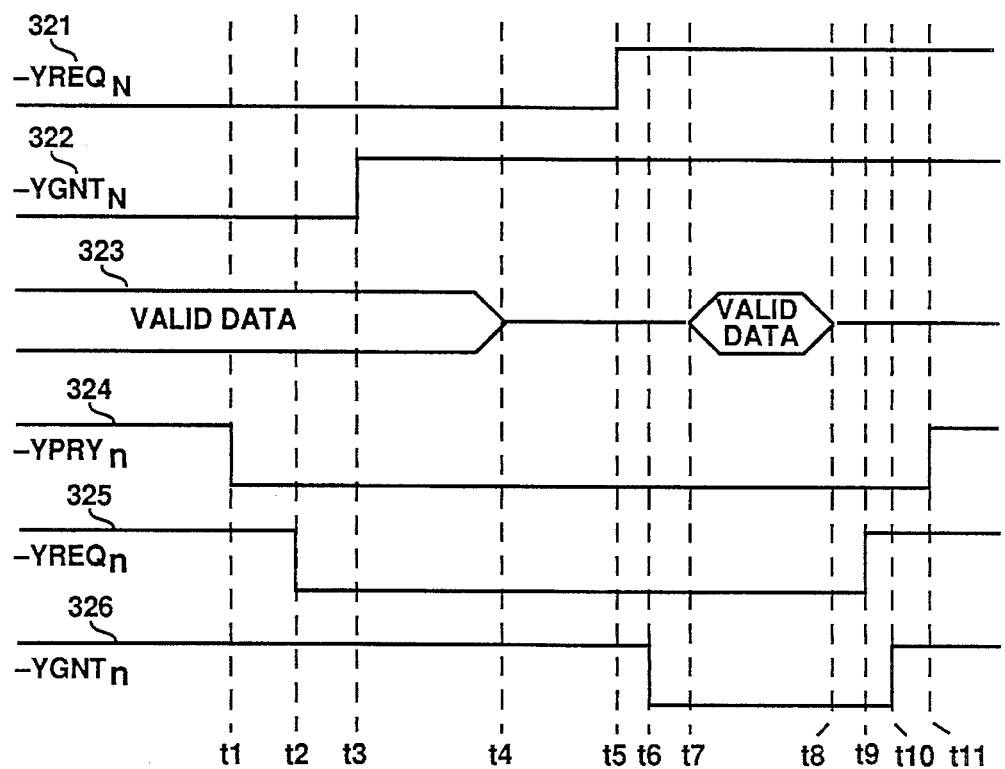

The present invention will be better understood by one of ordinary skill in the art with reference to the timing diagrams of FIGS. 2, 3 (a)–(c) and 4 (a)–(c). In these figures and in the accompanying text, signals will be generally referred to with signal names. It will be obvious that the particular signal names may be varied without departure from the scope and spirit of the present invention. Further, the notation used will normally refer to signal states as being active or inactive, as opposed to be high or low, one or zero, true or false, etc. Generally, in the description of the preferred embodiment, signals which are active when low are indicated with a leading minus sign ("−"). It will be obvious to one of ordinary skill that the active state of signals may be reversed from that of the present invention without departure from the inventive aspects of the present invention. As examples of this signal naming convention, see Table I, below:

TABLE I

| Signal Name | Electrical Notation | Logical Notation | State |
|---|---|---|---|
| YASTB | High | 1 or true | Active |
|  | Low | 0 or false | Inactive |
| −YASTB | Low | 1 or true | Active |
|  | High | 0 or false | Inactive |

In describing signals, many signals are more easily or conventionally referred to as a group. Therefore, in describing groups of signals, signals may be referred to using a decimal radix convention, such as YD(31:0) referring to 32 data lines of a bus. Within each group, the least significant bit of the group is referred to with a suffix of "0", e.g., YD0 refers to the least significant data line of the bus and YD31 refers to the most significant data line.

Further, the preferred embodiment of the present invention has a plurality of card slots for coupling cards to the system bus 120. In certain cases, signal names will have a lower case "n" following the signal name. In such cases, the "n" corresponds to one of the card slots. For example, −YREQn refers to one of a plurality of signals, each of the plurality of signals associated with a card slot. −YREQ3 refers to a signal associated with card slot number 3.

Signal Descriptions

It will be useful in understanding the present invention to generally describe certain signals utilized by the preferred embodiment.

Address Signal Group

This group of signals are address signals driven by a requestor at the beginning of an access.
YADDR or YADDR(31:2)
Refers to the 30 tri-state address lines on the address bus of the present invention. The address lines are not required to be latched by the processor and may not stay valid during the entire bus cycle.
−YBE[3:0]
These lines refer to each of the four bytes of a 32-bit word addressed by the YADDR(31:2) signal lines. Together, the −YBE[3:0] and YADDR(31:2) comprise the 32-bit bus addressing mechanism of the present invention.

Data Signal Group

YD(31:0) or YDATA(31:0)
Refers to the 32 tri-state data lines on the data bus of the present invention.

Request Signal Group

These signals are driven by the requestor when requesting and gaining access to the bus and by the arbiter when granting access to the bus.
−YREQn
The −YREQn signal indicates that a processor is requesting use of the system bus. For example, if a processor at slot 2 requests use of the system bus, the processor at slot 2 will activate (bring low) signal −YREQ2. The processor continues to activate signal −YREQ2 as long as the processor requires use of the system bus.
−YPRYn
The −YPRYn signal is driven by a requesting processor and is assumed to be stable whenever a processor is asserting its −YREQn signal. If the −YPRYn signal is inactive, the request is to follow a preemption exchange protocol (described in more detail with reference to FIG. 3 (c) and the below description of the preemption protocol). If the −YPRYn signal is active, the request is to follow a normal exchange protocol (described in more detail with reference to FIG. 3 (b) and the below description of the normal exchange protocol).
YSTAT[2:0]
These three signals define the type of transfer that is being requested by the bus agent. Transfers can be either I/O or memory operations.
−YGNTn
Responsive to a −YREQn signal being activated, a central arbiter will grant use of the system bus to the requesting processor when no requesting device with a higher priority is activating its −YREQn signal. The central arbiter activates the −YGNTn signal to signal the requesting processor that it has been granted access to the system bus. After granting access to the bus to a requester, the central arbiter may remove access by inactivating the −YGNTn signal. The requester is allowed to complete the information exchange on the current bus cycle and will then deactivate its −YREQn signal.

Response Signal Group

These signals are activated (or inactivated in the case of YRDY) by a module responding to a request from a bus agent.
YMODE[1:0]
This group of signals is used to indicate the type of access mode a particular selected memory can support.
YSPD[1:0]
This group of signals defines the access speed of a particular selected memory device.
YSIZE[1:0]
This group of signals defines the density of the particular selected memory device used for fast page mode operations.
−YCEN
When active, this line indicates that the particular memory access is cachable.
YRDY
This signal is normally high on the bus. It is pulled high during bus idle cycles. If a particular responding agent can respond in a deterministic mode, the agent will not drive the YRDY signal and it will remain high (active) on the bus. If the responding agent will respond in an asynchronous mode, then the agent will drive the YRDY signal inactive to initiate an asynchronous handshaking protocol.

Command Signal Group

These signals are used as commands to initiate and terminate accesses to the bus and to indicate a reset sequence.
−YASTB The −YASTB signal is the bus access strobe line indicating the beginning and end of bus events.
−YCASTB The −YCASTB signal is used by a requestor to initiate and terminate a fast page mode or static column mode memory request. The −YASTB signal is held active to keep memory active and individual cycles are initiated and terminated by the −YCASTB signal.
−RESETDRV This is the reset signal on the system bus used to indicate to modules in expansion slots the start of a reset sequence, such as at system power-up time.

Memory Initialization Signals

−YSELn

The −YSELn line is generated by address decode logic and, when active, indicates to a selected resource which module is being accessed. Each slot has its own −YSEL signal, the particular slot being indicated by the n.
YCONFIG[3:0]

The YCONFIG[3:0] signal lines are used to define memory module size at system power-up time in one embodiment of the present invention.
YIDn[1:0]

The YIDn[1:0] signals are associated with each slot of the present invention and are used to define memory module size at system power-up time in a second embodiment of the present invention.

MEMORY SIZE IDENTIFICATION (FIG. 2)

Referring now to FIG. 2, the method used by the preferred embodiment for identifying memory size is described in detail. The present invention allows for boards in the computer system which contain memory space accessible to processors of the present invention to identify the memory size which is available at the time the system is started up. It will be obvious to one of ordinary skill that memory size identification does not have to occur precisely at start-up time and that other system management functions may occur prior to memory size identification. Further, one of ordinary skill in the art can appreciate a system implementing the methods of the present which allows for reallocation of system memory after start-up of the computer system. For example, additional memory may be allocated as being accessible to the processors of the present invention after start-up.

The present invention comprises a central address decode module, shown as decode module 140 in FIG. 1. Although the preferred embodiment teaches a separate module for implementing the decode function, one of ordinary skill can appreciate other means may be utilized, such as by using a general purpose processing unit for decoding the address signals and assigning system memory address space. The address decode module latches size information received from each memory module in the system. The address decode module then assigns system address space to each memory module in the system.

System address space from memory location 0 to [first memory module size-1] is assigned to the first memory module. System address space from memory location [first memory module size] to memory location [second memory module size-1] is assigned to the second memory module. System address space from memory location [first memory module size+second memory module size] to memory location [first memory module size+second memory module size+third memory module size-1] is assigned to the third memory module. This pattern continues for assignment of system address space to each memory module in the system.

In the preferred embodiment, as shown by FIG. 2, a state machine in the address decode circuitry of is activated by the −RESETDRV signal 201 being activated such as at the time the system is powered up or at other times during system operation when a system reset is required (time t1). The state machine maintains the −RESETDRV signal active during the self-identification process. The state machine sets an internal address counter to zero. This counter is used for allocation of the memory address space for the various modules. The state machine then drives the −YSELn 202 signal active for slot 0 (time t2). If there is a board in slot 0, it drives configuration signals YCONFIG. 204 to indicate the amount of memory available in the slot. In the present invention, the YCONFIG signals are communicated on the bus over signal lines used for other signals during non-reset periods.

In one embodiment of the present invention, the −YIDn1 signal line and −YIDn2 signal line are used for providing memory size identifying information, as illustrated with reference to Table II(a), below. Note, with reference to Table II(a) and other tables in this specification, a "H" indicates a high state on the bus and a "L" indicates a low state.

TABLE II(a)

| YIDn1 | YIDn0 | MEMORY SIZE |
| --- | --- | --- |
| H | H | 0 Megabytes |
| L | H | 4 Megabytes |
| H | L | 8 Megabytes |
| L | L | 16 Megabytes |

In this first embodiment, all modules in all slots in the system provide memory size information on signal lines associated with the particular slot during the time the −RESETDRV signal is activated. The modules maintain these signals until the −RESETDRV is inactivated. During the time the −RESETDRV signal is activated, the decode module polls the signals associated with each slot and determines memory configuration information for that slot.

A second embodiment of the present invention, utilizes the YCONFIG signal lines during the reset period for configuration of memory. The memory size information communicated in this embodiment is understood with reference to Table II(b).

TABLE II(b)

| YCONFIG3 | YCONFIG2 | YCONFIG1 | YCONFIG0 | MEMORY SIZE |
|---|---|---|---|---|
| H | H | H | H | 0 Mbytes |
| H | H | H | L | 1 Mbyte |
| H | H | L | H | 2 Mbytes |
| H | H | L | L | 4 Mbytes |
| H | L | H | H | 6 Mbytes |
| H | L | H | L | 8 Mbytes |
| H | L | L | H | 12 Mbytes |
| H | L | L | L | 16 Mbytes |
| L | H | H | H | 24 Mbytes |
| L | H | H | L | 32 Mbytes |
| L | H | L | H | 48 Mbytes |
| L | H | L | L | 64 Mbytes |
| L | L | H | H | 80 Mbytes |
| L | L | H | L | 96 Mbytes |
| L | L | L | H | 128 Mbytes |
| L | L | L | L | 256 Mbytes |

As can be seen with reference to Tables II(a) and II(b), in the case of a module not being present in a slot, or if the module has no system memory available, status information is returned indicating no memory (0 Mbytes) is available.

In the case of the second embodiment, the −YSELn signal is utilized to select a slot for providing memory configuration information. As will be seen with reference to FIG. 2, the −RESETDRV signal 201 is activated at time t1. Responsive to the −RESETDRV signal being activated, the decode module begins polling each of the slots for memory configuration information by driving the appropriate −YSELn signal 202. For example, the decode module first drives the −YSELn signal 202 to select slot 0 at time t2. The module at slot 0 then drives configuration information onto the YCONFIG lines 204 at time t3 and maintains valid information on these lines until the decode module inactivates the −YSELn signal 202 at time t4. The module at slot 0 then stops driving valid information at time t5.

If the module in slot 0 responds with a memory configuration of greater than 0 Mbytes, the decode module increments the internal counter and assigns system address space to the module as described above.

This cycle is repeated for each slot by the decode module driving the appropriate −YSELn signal 202 and the module at the corresponding slot responding by driving YCONFIG lines 204 during time t7.

The state machine disables its control of the −RESETDRV signal 201 after completion of this cycle for each memory module.

The address decode module identifies, during subsequent information exchanges between modules in the system, the appropriate memory module corresponding to a given address. This protocol allows elimination of configuration switches on the motherboard of the system for configuring memory on individual memory modules. Further, address decode logic is centrally located in address decode module 140. This eliminates the need for address decode circuitry on each of the individual memory modules.

BUS ARBITRATION CYCLE

The present invention discloses three arbitration cycles for arbitrating access to the system bus by a requestor. In general, a processor asserts its −YREQn signal and, depending on the type of arbitration desired, its −YPRYn signal. A central arbiter receives a separate −YREQn and −YPRYn signal for each potential requester in the system. The central arbiter evaluates requests and grants ownership of the bus as described in connection with FIGS. 3 (a)–(c). The three arbitration cycles will be referred to as: (1) normal arbitration, (2) exchange protocol and (3) preemption protocol.

Normal Arbitration—FIG. 3 (a)

Referring first to FIG. 3 (a), the normal bus arbitration protocol is illustrated. In normal arbitration, a default .bus owner, the motherboard processor in the preferred embodiment, has control of the bus. A coprocessor (requestor) drives its −YREQn signal 301 active and its −YPRYn signal 302 inactive at time t1. Responsive to the coprocessor driving its −YREQn signal 301 active, the central arbiter disables the default bus owner from accessing the bus by inactivating its −YGNTn signal (not shown) and then activates the requestor's −YGNTn signal 303 at time t2 (after the previous bus onwer releases its −YREQn line). The requestor senses its −YGNTn signal 303 being driven active and drives the appropriate transfer information onto the bus 304 at time t3.

The requestor continues to drive its −YREQn signal 301 active as long as it continues to transfer information onto the bus (during time t3 through t4). Unless a higher priority request is received or a refresh cycle is required, the central arbiter continues to drive active the −YGNTn signal 303. Subsequent to completing the transfer of information, the requestor inactivates its −YREQn signal (at time t5). The arbiter then inactivates the −YGNTn signal and grants access to the bus to the highest priority pending requestor.

Exchange Protocol—FIG. 3 (b)

Referring to FIG. 3 (b), the bus exchange protocol is illustrated. The bus exchange protocol allows exchange of control of the bus from one coprocessor to another. In the illustration of FIG. 3 (b), coprocessor 1 has control of the bus at time t1 (the central arbiter is asserting the −YGNT1 signal 316 and its −YPRY signal is inactive, granting coprocessor 1 access to the bus). Coprocessor 0, which is lower priority than coprocessor 1, requests access to the bus by activating its −YREQ0 signal 310 at time t1. Coprocessor will continue to assert its −YREQ0 signal 310 until it is granted control of the bus. Coprocessor 0 does not assert its −YPRY0 signal 311. Therefore, this is not a preemption request and coprocessor 1 is allowed to complete its information exchange on the bus (valid data continues to be transmitted on the bus 313 during time interval t1 through t2).

Coprocessor 1 completes its information exchange at time t2. It then inactivates the −YREQ1 signal 314 at time t3, indicating to the central arbiter it is ready to give up control of the bus. The central arbiter inactivates the −YGNT1 signal 316 at time t4 and activates the −YGNT0 signal 312 at time t5. Activating the −YGNT0 signal grants coprocessor 0 access to the bus. Coprocessor 0 begins its information exchange on the bus 313 at time t6.

Preemption Protocol—FIG. 3 (c)

A processor may preempt access to the bus by another coprocessor if it has higher priority by asserting its −YPRYn signal. Priority levels in the computer system of the preferred embodiment are shown in Table III, below:

TABLE III

| Priority Level | Slot |
|---|---|
| 0 | Refresh |
| 1 | System CPU (High priority active) |
| 2 | Card slot 0 (YPRYn active) |
| 3 | Card slot 1 (YPRYn active) |
| 4 | Card slot 2 (YPRYn active) |
| 5 | I/O |
| 6 | Card slot 0 (YPRYn inactive) |
| 7 | Card slot 1 (YPRYn inactive) |
| 8 | Card slot 2 (YPRYn inactive) |
| 9 | System CPU (High priority inactive) |

In the preferred embodiment, priority level 0 is the highest priority and priority level 9 is the lowest priority. The default bus owner is the motherboard; all other requestors have a higher priority, therefore, any pending request by any other requestor will preempt the motherboard.

The present invention discloses use of two priority levels for each coprocessor card. The first level (referred to in the preferred embodiment as the "normal level") is a lower priority level than the priority of the I/O system. This priority level is used for normal processing. The second priority level (referred to in the preferred embodiment as the "augmented level") is a higher priority level than the priority level of the I/O system. Coprocessors may elevate their bus requests above the level of the I/O system. In the preferred embodiment, a coprocessor using its augmented priority level will not interrupt an I/O cycle, however, the I/O subsystem will be prevented from preempting the coprocessor once the coprocessor has been granted access to the system bus. In the normal level, the I/O subsystem may preempt a coprocessor which has been granted access to the system bus. Augmented priority levels are useful where it is desired to allow the coprocessors to operate in an environment having an increased share of the bus bandwidth.

As can be seen with reference to Table III, in implementations in which the CPU requires uninterrupted access to the system bus, it will operate at priority level 1 (next to highest priority). In all other cases, it will operate at priority level 9 (lowest priority).

The preemption protocol of the present invention is described in more detail with reference to FIG. 3 (c). Coprocessor n has control of the bus at time t1 (−YGNTn signal 322 is active) and is transferring information over the bus 323. Coprocessor m, which is lower priority than coprocessor n in normal mode, attempts to gain control of the bus; first, coprocessor m activates its −YPRYm signal 324 to indicate this it will be doing a preemption bus request at time t1. In the preferred embodiment, coprocessor m may activate either its normal or augmented −YPRYm signal. At time t2, coprocessor m activates −YREQm signal 325 to request control of the bus. Responsive to this request and the −YPRYm signal being active, the central arbiter inactivates the −YGNTn signal 322 at time t3.

Coprocessor n continues to control the bus and transfer information through the next bus cycle (until time t4) and then inactivates its −YREQn signal 321 at time t5. Responsive to coprocessor n inactivating −YREQn signal 321, the central arbiter activates signal −YGNTm 326 at time t6. Coprocessor m then controls the bus and may perform its information transfer on the bus 323 (from time t7 through t8).

Anytime after detecting the beginning of a bus event (−YASTB being driven active), coprocessor n may reactivate its −YREQn signal 321 to request control of the bus in order to complete its interrupted bus transfer. Control of the bus will be returned to coprocessor n after coprocessor m completes its information transfer, assuming there are no higher priority arbitration requests pending.

After completing its information transfer, coprocessor m inactivates the −YREQm signal 325 (at time t9). The central arbiter then inactivates the −YGNTm signal 326 at time t10 responsive to coprocessor m releases its request. Coprocessor m may inactivate its −YPRYm signal 324 after the −YGNTm signal 326 is inactivated (such as at time t11).

REQUEST/RESPONSE PROTOCOL,

The present invention discloses a request/response protocol which allows memory devices to identify their access mode, (YMODE[1:0]), page size (YSIZE[1:0]), whether the memory device is cachable (−YCEN), the speed of the memory device (YSPD(1:0)) and whether the device may be accessed deterministically or asynchronously (YRDY).

Specifically, the preferred embodiment of the present invention allows four access modes: (1) standard RAS/CAS mode, (2) fast paged mode, (3) static column mode and (4) burst mode. The memory device identifies the mode it is capable of operating in by activating or inactivating the appropriate YMODE(1:0) group signals, as shown with reference to Table IV, below:

TABLE IV

| YMODE | YMODE | ACCESS MODE |
|---|---|---|
| L | L | Fast Paged Mode |
| L | H | Static Column Mode |
| H | L | Burst Mode |
| H | H | Standard RAS/CAS Mode |

Standard RAS/CAS mode is used for I/O and other bus accesses as well as standard memory accesses. Static column mode is a mode in which the row addresses are latched by the memory device and column addresses flow through. Data changes with respect to a change in column addresses (i.e., an array may be read down its columns). Fast paged mode is similar to static column mode, however, the CAS addresses do not flow through but instead are latched on each successive access by the active going edge of the CAS. Burst mode is reserved for support of a future processor which may allow data to be "bursted" to or from the processor at a high speed. However, an understanding of the workings of any of the particular modes are not required for an understanding of the present invention.

The YSIZE [1:0] signals of the preferred embodiment is interpreted with reference to TABLE V.

TABLE V

| −YSIZE[1] | −YSIZE[0] | PAGE SIZE |
|---|---|---|
| L | L | Support for 4M devices |
| L | H | Support for 16M devices |
| H | L | Support for 256K devices |
| H | H | Support for 1M devices |

The −YCEN signal is interpreted with reference to TABLE VI. A memory access is considered to be cachable when the coherency of data in memory and cache can be enforced.

TABLE VI

| −YCEN | CACHABLE |
|---|---|
| L | The memory access is cachable |
| H | The memory access is not cachable |

The −YSPD signal is interpreted with reference to TABLE VII. The speed in the preferred embodiment is defined in terms of the RAS (row address strobe) access time.

TABLE VII

| −YSP(1) | -YSP(0) | MEMORY SPEED |
|---|---|---|
| L | L | 35 ns or faster devices |
| L | H | 60 ns or faster devices |
| H | L | 85 ns or faster devices |
| H | H | 100 ns or faster devices |

When a processor makes a request, it identifies the type of request using a set of request lines YSTAT[2:0]. The YSTAT [2:0] lines define the type of access currently on the bus and are coded, in the preferred embodiment, as defined by Table VIII, below:

TABLE VIII

| YSTAT2 | YSTAT1 | YSTAT0 | TYPE |
|---|---|---|---|
| L | L | L | Reserved |
| L | L | H | Reserved |
| L | H | L | I/O Read |
| L | H | H | I/O Write |
| H | L | L | Burst mode cycle |
| H | L | H | reserved |
| H | H | L | Memory Read |
| H | H | H | Memory Write |

Generally, when a coprocessor (requestor) makes a request for access to a memory device, the responding memory device will respond within a predetermined period of time to the request with information identifying its characteristics. If the memory device responds that it is able to operate in a deterministic manner, the requesting coprocessor waits a determinable period of time and then pulls data off of the bus. If the memory responds that it must operate in an asynchronous manner, the requesting processor accesses the memory device asynchronously encountering the synchronization penalties associated with the required handshaking.

FIGS. 4 (a)–(d) illustrate access protocols for deterministic reads, asynchronous reads, deterministic writes and asynchronous writes, respectively.

Deterministic Read Cycle—FIG. 4 (a)

Referring first to FIG. 4 (a), after a processor has been granted control of the bus as described in connection with FIGS. 3 (a)–(c), the processor drives an address 401 onto the bus at time t1. The processor also drives (at time t1) the appropriate request signals 402, as illustrated by Table VIII.

After setting up the ADDRESS 401 and request signals 402, the processor activates the −YASTB signal 403 at time t2. The −YASTB signal 403 indicates the beginning of a bus event.

If the YRDY signal 404 is active, a deterministic access is assumed. The YRDY signal 404 is normally in the active state and, therefore, a deterministic device does not need to drive this signal. For a deterministic access, the bus slave (memory module) asserts the appropriate response group signals. Based on the access mode and speed as defined above, the processor determines an appropriate number of wait states to delay before accessing data on the bus. In this manner (i.e., making a request and receiving a response—request/response protocol), the processor is able to customize accesses to memory based on the particular type and speed of memory being accessed. Further, this customization of memory may be accomplished without any requirement of user settable switches.

The deterministic period is calculated in the preferred embodiment based upon the access time required for the memory to respond to a given request. The deterministic period varies depending on the mode of memory operation and the speed of the memory device. Generally, the deterministic period may be calculated as follows:

$$T_{del} + Taccess + T_{data\ setup} = T_{Deterministic}$$

Where:

$T_{del}$=The amount of time from the processor reference to the −YASTB signal being active on the bus (usually with reference to a clock, e.g., −YASTB will be switched based on the processor clock; however, there is a delay from the clock to the −YASTB signal changing state. $T_{del}$ includes this delay);

Taccess=The period of time from −YASTB being active on the bus to valid data being on the bus (for example, in a 100 ns memory as may be utilized by the preferred embodiment, this period is 140 ns);

$T_{data\ setup}$=The data setup period of the processor; and $T_{Deterministic}$=The deterministic memory access time for a standard RAS/CAS device.

After providing control information the YMODE, YSIZE, YCEN and YSP control lines, the data bus (YD) 405 may be driven with valid data by a bus slave. The processor waits a deterministic amount of time (time t3 through t4, determined based on the speed and type of the memory) and then may access data on the bus. Data on the bus is assumed to be valid for deterministic transfers after the deterministic period of time.

After reading the data from the bus, the processor releases the ADDRESS lines 401 and inactivates its request signals 402 at time t5. The processor then inactivates the −YASTB signal 403 at time t6. When the bus slave detects the −YASTB signal 403 going inactive, it may release the data lines (YD) 405.

This protocol is repeated for any further reads required from the memory by the processor.

Asynchronous Read Cycle—FIG. 4 (b)

Referring to FIG. 4 (b), the protocol for an asynchronous read is illustrated. In an asynchronous read, a processor which has been granted control of the bus drives address signals (ADDRESS) 411 onto the bus and drives its request lines 412 at time t1. The processor then activates the -YASTB signal 413 at time t2.

The selected bus slave (e.g. memory) deactivates the YRDY signal 414 at time t3 to indicate the read will be an asynchronous read. In the case of an asynchronous read, the YSIZE and YSP signals are ignored by the processor and the memory is accessed in a standard access mode, asynchronous manner.

Responsive to the -YASTB signal 413 being driven active, the selected device begins to drive data on the the data bus (YD) 415 at time t4. When valid data is available, the bus slave drives the YRDY signal 414 active (time t5). The bus master may then read data from the bus. After sensing the YRDY signal 414 being driven active, the bus master discontinues asserting its the ADDRESS signals 411 (time t6) and deactivates the -YASTB signal 413 at time t7.

The bus slave detects the -YASTB signal 413 being driven inactive and discontinues asserting data signals 415 at time t8. The YRDY signal 414 is active and will remain active throughout the bus idle state.

The bus master may request transfer of more data by repeating the above-described protocol.

Deterministic Write Cycle—FIG. 4 (c)

Referring to FIG. 4 (c), the deterministic write cycle of the preferred embodiment is illustrated. At time t1, the bus master which has been granted control of the bus drives an address onto the bus (ADDRESS signal 421), drives its request signal 422, and drives the data to be transferred onto the bus (YD(31:0) 425). The processor then asserts the -YASTB signal 423 at time t2.

Prior to the -YASTB signal being asserted, the address signal 421 is decoded to determine the particular memory device having the selected memory address space location. In the preferred embodiment, the selection of a particular device is dependent on system memory address space assignments based on the memory size identification information provided by each of the memory modules to the decoder module at system power-up time.

After a deterministic access time of the system bus has been met, the processor releases request signal 422 at time t3, releases address signals 421 at time t4, deactivates -YASTB signal 423 at time t5 and releases data signals 425 at time t6. As described above, the deterministic access period is based on the characteristics of the memory device; these characteristics being supplied to the processor at the time the memory device replies with its response signals. YRDY signal 424 remains active during the entire cycle. This completes the deterministic memory write cycle.

Asynchronous Write Cycle—FIG. (d)

Finally, referring to FIG. 4 (d), an asynchronous write cycle as utilized by the present invention is illustrated. Again, the current bus master (processor granted access to the bus) drives address signals (ADDRESS 431) onto the bus, drives request signals 432 and asserts data (YD(31:0) 435) onto the bus at time t1. The -YASTB signal 433 is asserted at time t2.

Responsive to assertion of the -YASTB signal 433, the address signal is decoded and the appropriate memory selected during time t2 through t3. If the selected device cannot respond to the write request in a deterministic time (i.e., this will be an asynchronous write), the selected memory inactivates the YRDY signal 434 at time t4. The information exchange is delayed during the period of time the YRDY signal 434 is inactivated (time t4 through t5). When the selected memory device is ready to respond, the YRDY signal 434 is again activated, time t5.

Responsive to the YRDY signal 434 being activated, the bus master releases the request signal 432 at time t5, releases the address signal lines 431 at time t6 and inactivates the -YASTB signal 433 at time t7.

The selected memory detects the -YASTB signal 433 being inactivated, releases the YRDY signal 434 at time t8. However, in the preferred embodiment, YRDY signal 434 is held active by a pull-up resistor. The bus master then releases the data lines 435 at time t8.

Fast Paged Mode Operation (Read or Write)

Static Column Mode Operation (Write)—FIG. 4 (e)

Referring to FIG. 4 (e), the protocol for fast paged mode operations, both read and write, or static column mode write operations is illustrated. During any of these operations, the processor drives the desired address on the bus, lines 443. The processor also drives the request group signals, lines 444. In the case of a write operation (either fast paged mode or static column mode), the processor also drives data lines 446.

The address decode module then generates the appropriate -YSELn signal 442 to select the memory addressed by the address on lines 443. The processor then asserts the -YASTB signal 441 to initiate the first operation. The selected memory then drives the appropriate response signals 445 indicating the type of memory mode the addressed memory is capable of operating in. The response signals 445 remain stable during the entire period the -YASTB signal 441 is asserted.

After the memory is selected and provides a response, the decode module may remove the -YSELn signal 442. The selected memory remains selected for the entire period the -YASTB signal is asserted.

As one inventive feature of the present invention, after determining, based on response signals 445, that the memory can be accessed in either a fast paged mode or static column mode, the processor activates the -YCASTB signal 448 to indicate the completion of the first operation. An event is complete either after completing placing data onto the bus for transfer to the memory on lines 446 or after completion of addressing the memory and the data being placed on the bus, lines 447.

In the case of the processor detecting the next operation is to the same page of memory, the processor deactivates the -YCASTB signal 448. The -YCASTB signal is again asserted after completion of the second operation.

At the time the processor determines it has completed all of its operations or when the processor determines the next operation will result in a page miss, the processor deasserts the -YASTB signal.

The process of asserting and deasserting the -YCASTB signal to control accesses to the same page of memory while holding the -YASTB signal active during an entire cycle of accesses a given page offers inventive advantages over the known prior art.

Figure 4A:
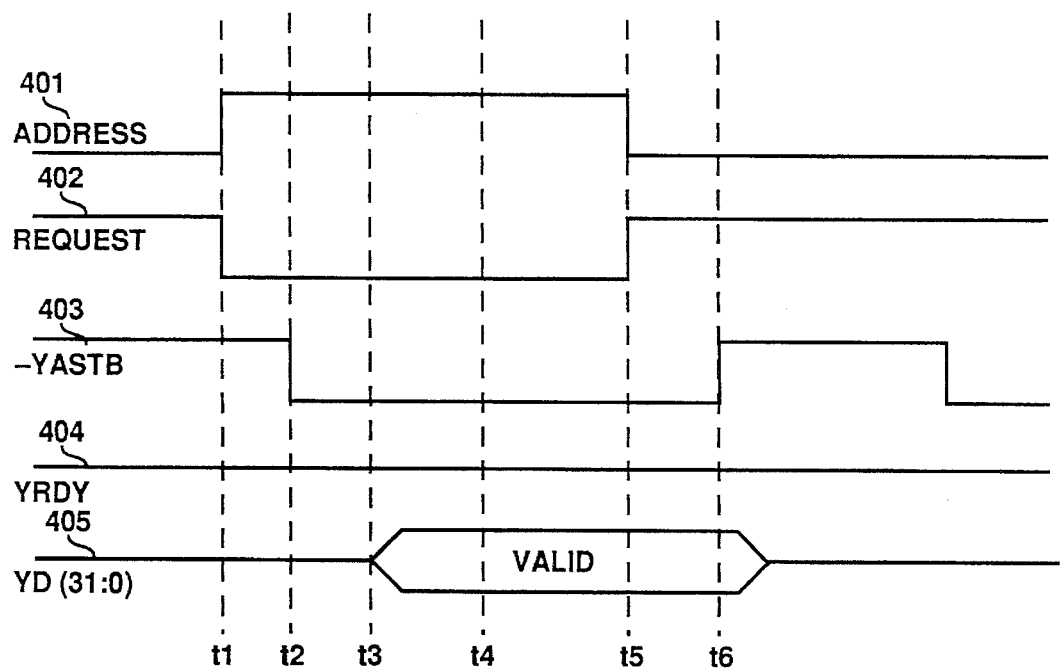
FIG. 4 (a) ms a timing diagram illustrating a deterministic read cycle as may be utilized by the present invention.
Figure 4B:
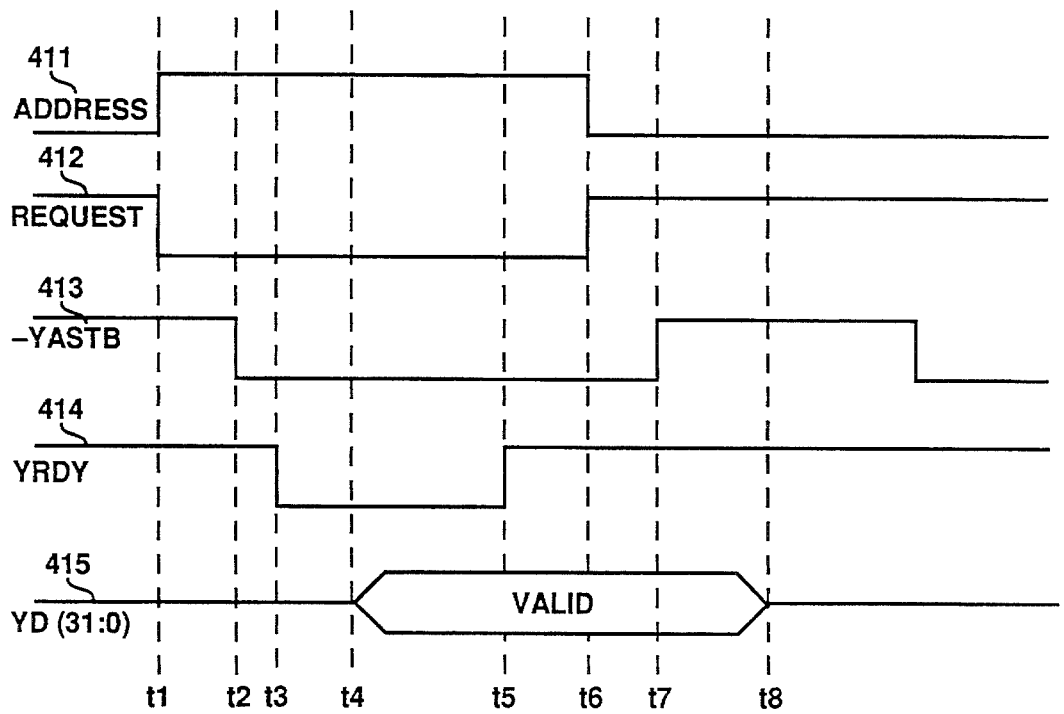
Figure 4C:
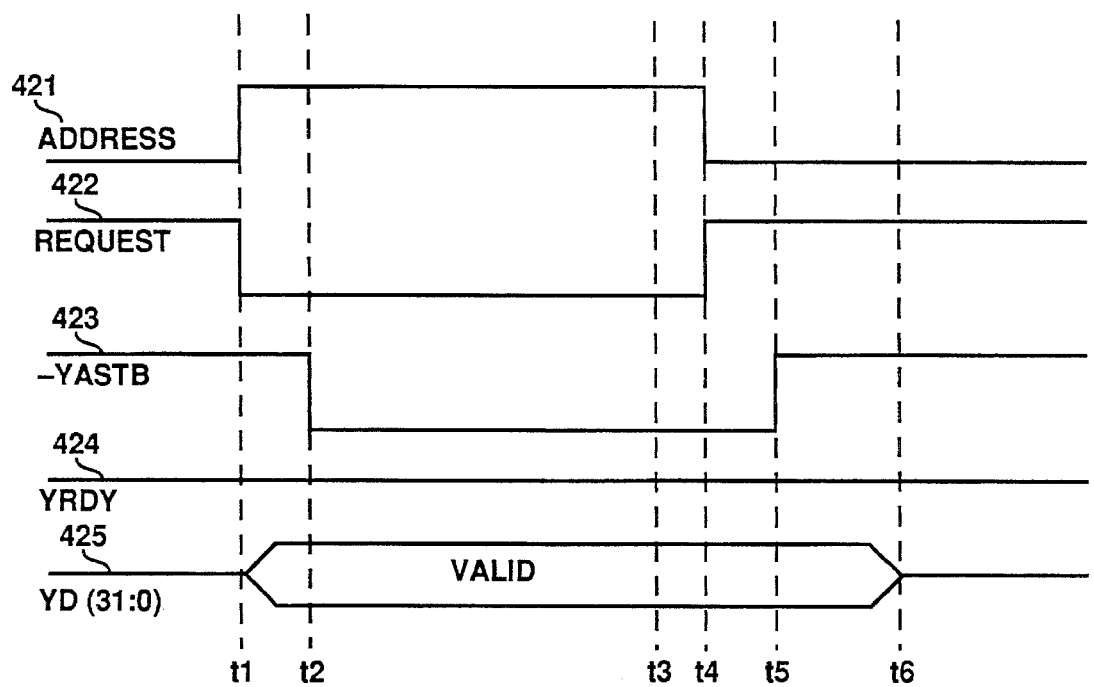
Figure 4D:
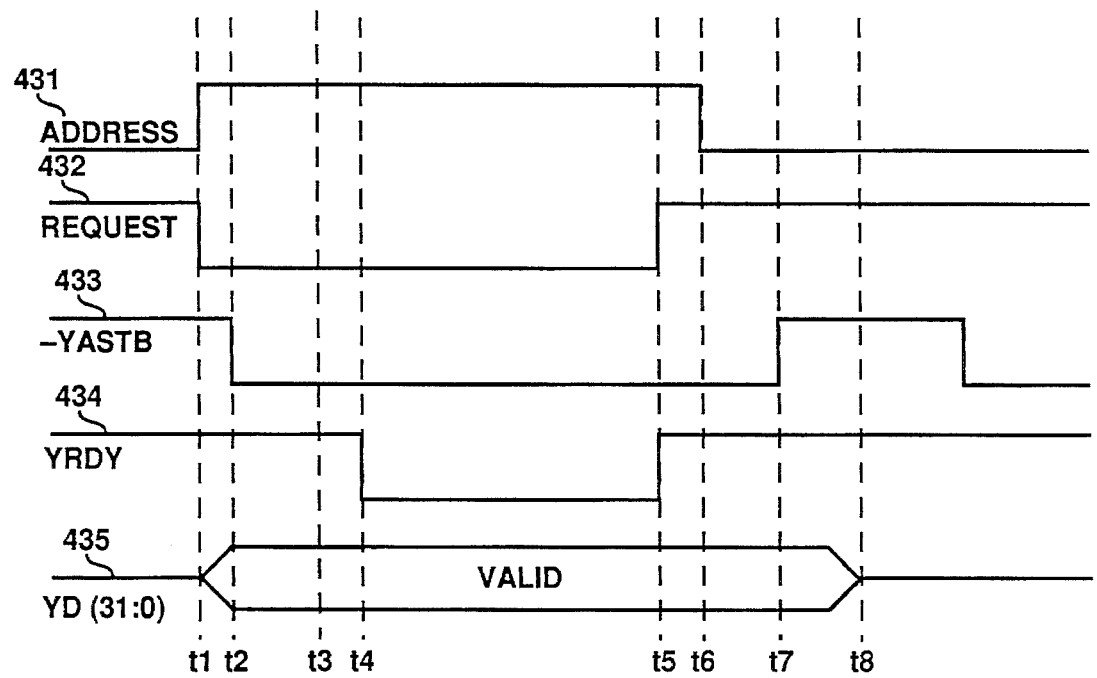
Figure 4E:
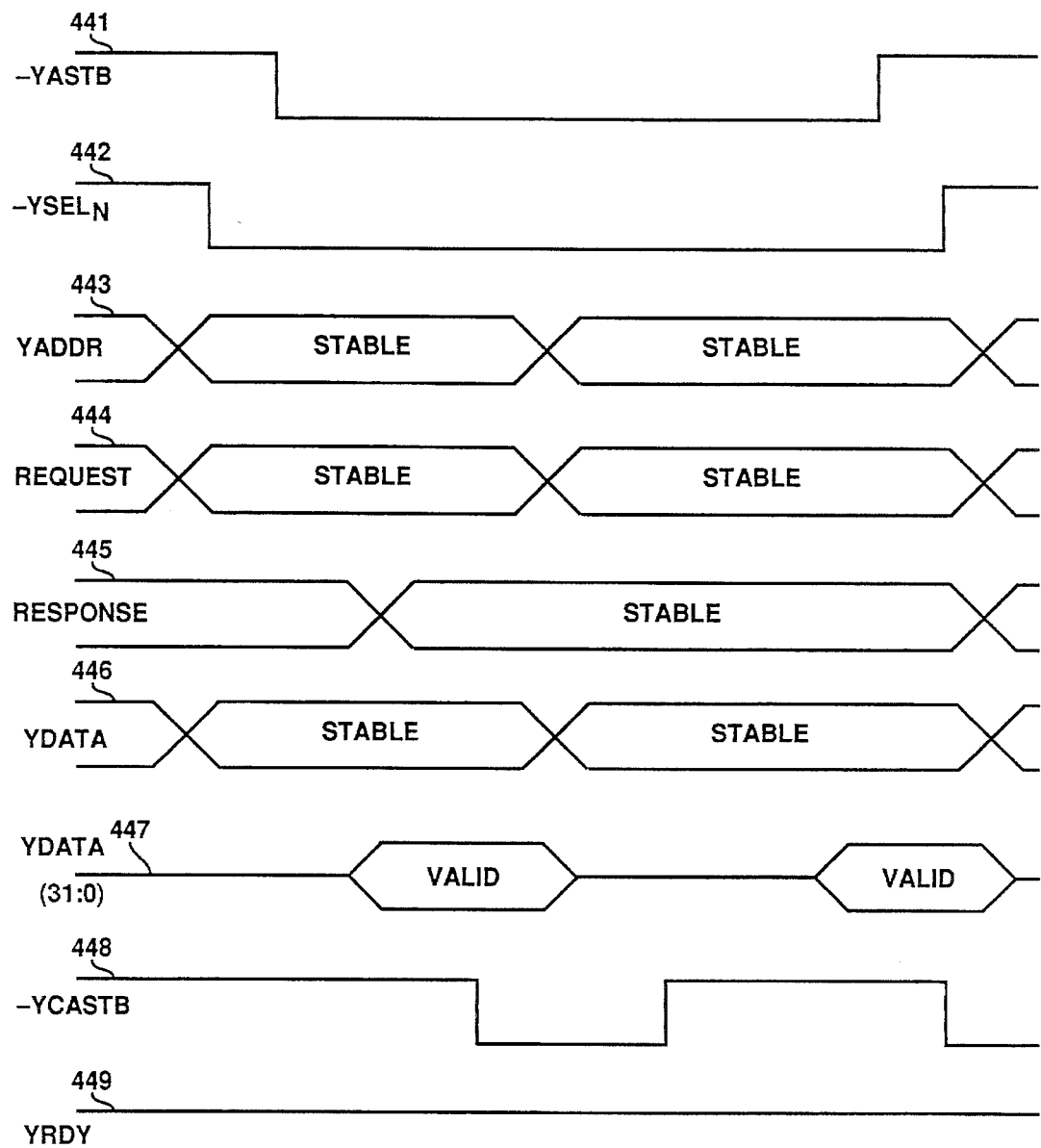
Figure 4F:
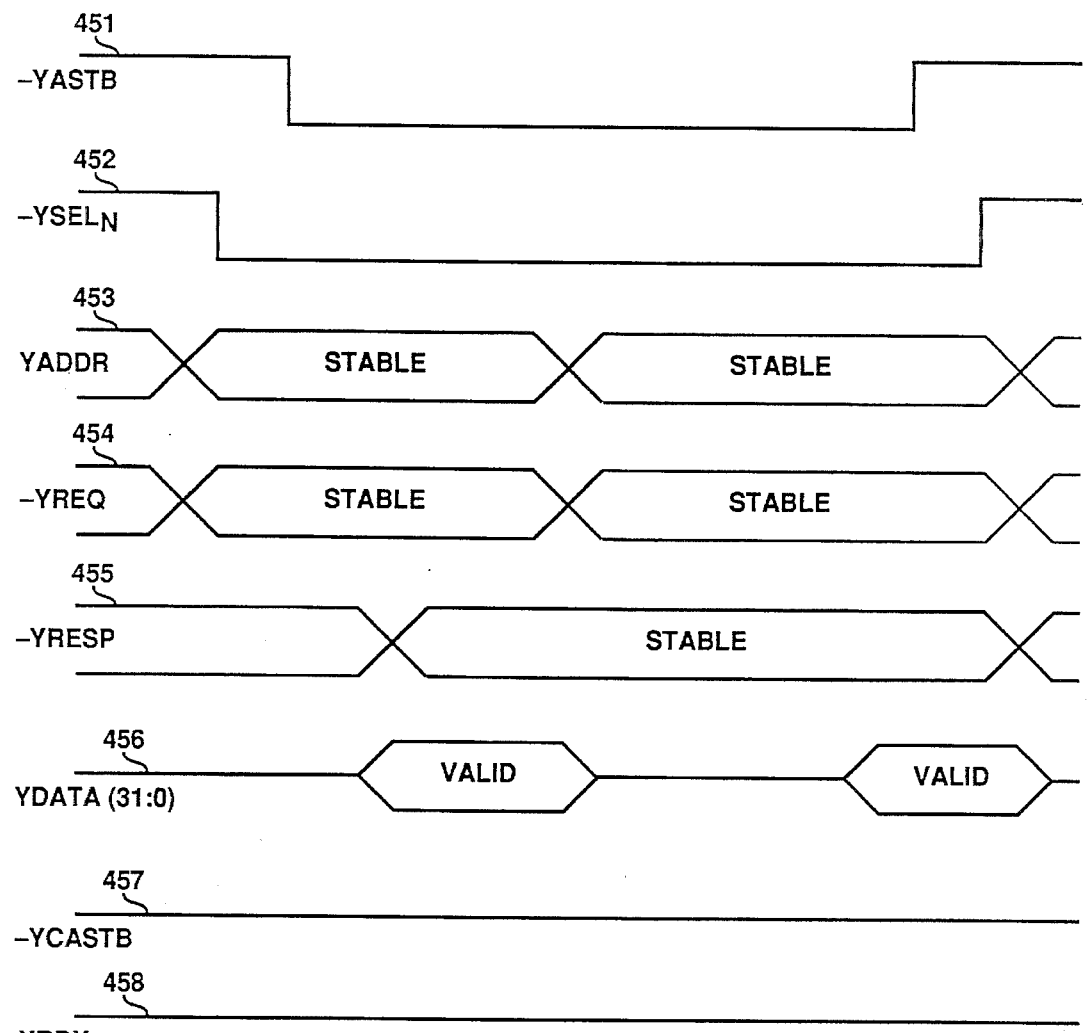

Static Column Mode Read Operations—FIG. 4(f)

Referring to FIG. 4 (f), the process utilized by the present invention for performing static column mode read operations is described in more detail. As described above in connection with FIG. 4 (e), the processor drives an address onto the bus on lines 453 along with a request type on request lines 454. The address decode logic is employed to select a particular memory. The selected memory is indicated by −YSELn line 452. The processor then asserts the −YASTB signal 451 to initiate a read operation. The selected resource responds with information on response lines 455 stating it is capable of supporting static column mode memory accesses.

The decode module may then stop asserting the −YSELn signal 452. The selected memory will remain selected as long as the −YASTB signal remains active.

The −YCASTB signal 457 is inactive at the beginning of the read cycle and remains active after each static column read request. The processor reads data on lines 456 after the first memory access cycle. The data is returned within a deterministic period of time as described above. The processor may then supply new address information on the address lines 453 and a second read cycle is initiated. Further read cycles may be initiated if required for more data on the same page. After the processor completes its data read requirements, or when a new page is to be selected, the −YASTB signal is deasserted.

In the present invention, the −YCASTB signal 457 remains inactive after a static column read and is asserted after a static column write. The −YCASTB signal is deasserted following the write cycle to indicate a new cycle has started.

The present invention utilizes two modes of operation for fast page mode operations. A first mode allows fast page mode operations to be utilized for both reads and writes. The −YASTB signal is held after an access in anticipation of another cycle to the same DRAM page as the page accessed in the last cycle. The second mode of operation fast paged mode operations are used only for write cycles in which, at the completion of the current write cycle, another cycle is pending. In this second mode, reads are always standard RAS/CAS accesses.

Thus, a system for self-identification of memory size information and configuration of memory modules within system memory address space has been described.

We claim:

1. In a computer system comprising a processor module having a processor, a memory subsystem of pre-installed memory modules, a bus coupling the processor module and the memory subsystem to each other, an apparatus for sequentially conducting a plurality of bus transactions between the processor and the pre-installed memory modules, the apparatus comprising:

first circuitry disposed in the processor module and coupled to the bus for initiating and facilitating each bus transaction by generating and maintaining a first plurality of request signals on the bus for each bus transaction, one bus transaction at a time, referencing a first operating clock of the processor;

second circuitry disposed in a first pre-installed memory module of the memory subsystem and coupled to the bus for conditionally outputting a first plurality of response signals onto the bus for a bus transaction, responsive to the bus transaction's request signals, referencing a second operating clock of the memory subsystem, which is independent of the first operating clock of the processor, whenever the bus transaction's request signals address the first pre-installed memory module, the first response signals conveying access characteristic information about the first pre-installed memory module;

third circuitry disposed in the processor module and coupled to the bus for conditionally determining a time value in terms of the first operating clock for a bus transaction, referencing the first operating clock, whenever the bus transaction's request signals solicited the first response signals, the time value being dynamically determined using the conveyed access characteristic information of the bus transaction, and denoting an amount of time in terms of the first operating clock the first circuitry is to wait before concluding the bus transaction; and the first circuitry is further used for concluding each bus transaction whose request signals solicited the first response signals, by ceasing to maintain the request signals on the bus, after having waited accordingly.

2. The apparatus as set forth in claim 1, wherein the apparatus further comprises:

fourth circuitry disposed in the first pre-installed memory module and coupled to the bus for conditionally outputting and maintaining response data onto the bus for a bus transaction, responsive to the bus transaction's request signals, referencing the independent second operating clock, whenever the bus transaction's request signals denote a memory read bus transaction, and the bus transactions' request signals address the first pre-installed memory module, and fifth circuitry disposed in the processor module and coupled to the third circuitry and the bus for conditionally latching response data off the bus for a bus transaction, referencing the first operating clock, whenever the bus transaction's request signals denote a memory read bus transaction, the third circuitry has dynamically determined a time value in terms of the first operating clock for the bus transaction, and time has elapsed by the first operating clock based time value determined since the first circuitry initiated the bus transaction;

when concluding each bus transaction whose request signals, in addition to having solicited the first response signals, further denote a memory read bus transaction, the first circuitry further allows time in terms of the first operating clock for the fifth circuitry to latch the response data of the bus transaction, before ceasing to maintain the bus transaction's request signals on the bus; and responsive to the cessation of the request signals of the bus transaction, the fourth circuitry also ceases to maintain the response data on the bus.

3. The apparatus as set forth in claim 2, wherein, the apparatus further comprises sixth circuitry disposed in a second pre-installed memory module of the memory subsystem and coupled to the bus for conditionally outputting second response signals onto the bus for a bus transaction, responsive to the bus transaction's request signals, referencing the second operating clock of the memory subsystem, whenever the bus transaction's request signals address the second pre-installed memory module, the second response signals denoting the second pre-installed memory module is going to conduct the bus transaction asynchronously;

the third circuitry is further used for detecting the conditionally generated second response signals for a bus transaction, and in response monitoring for third response signals of the bus transaction, in lieu of dynamically determining a time value in terms of the first operating clock for the bus transaction, whenever the third circuitry detects the second response signals for the bus transaction, the third response signals denoting the second pre-installed memory module is ready to complete the bus transaction;

the sixth circuitry is further used for conditionally outputting the third response signals onto the bus for a bus transaction, referencing the independent second operating clock, whenever the sixth circuitry has previously output the second response signals for the bus transaction, and the fourth circuitry has subsequently output the response data onto the bus for the bus transaction;

the fifth circuitry is also used for conditionally latching response data off the bus for a bus transaction, referencing the first operating clock, whenever the bus transaction's request signals denote a memory read bus transaction, and the third circuitry has first detected the second response signals and subsequently detected the third response signals for the bus transaction;

the first circuitry is further used for concluding each bus transaction signals whose request signals solicited the second response signals instead, upon detecting the third response signals for the bus transaction by the third circuitry, and in like manner, when concluding each bus transaction whose request signals, in addition to having solicited the second response signals, further denote a memory read bus transaction, the first circuitry further allows time in terms of the first operating clock for the fifth circuitry to latch the response data of the bus transaction, before ceasing to maintain the bus transaction's request signals on the bus; and responsive to the cessation of the request signals of the bus transaction, the fourth circuitry also ceases to maintain the response data on the bus.

4. The apparatus as set forth in claim 1, wherein the apparatus further comprises:

fourth circuitry disposed in the processor module and coupled to the bus for conditionally generating and maintaining write data onto the bus for a bus transaction, in substantially the same time in terms of the first operating clock as the first circuitry generating and maintaining the bus transaction's request signals, referencing the first operating clock, whenever the bus transaction's request signals denote a memory write bus transaction, and fifth circuitry disposed in the first pre-installed memory module and coupled to the bus for conditionally latching write data off the bus for a bus transaction, responsive to the bus transaction's request signals, referencing the independent second operating clock, whenever the bus transaction's request signals denote a memory write bus transaction, and the bus transaction's request signals address the first pre-installed memory module; and when concluding each bus transaction whose request signals, in addition to having solicited the first response signals, further denote a memory write bus transaction, the fourth circuitry also ceases to maintain the write data on the bus in substantially the same time the first circuitry ceases to maintain the request signals of the bus transaction, 5. The apparatus as set forth in claim 4, wherein the apparatus further comprises sixth circuitry disposed in a second pre-installed memory module of the memory subsystem and coupled to the bus for conditionally outputting second response signals onto the bus for a bus transaction, responsive to the bus transaction's request signals, referencing the second operating clock of the memory subsystem, whenever the bus transaction's request signals address the second pre-installed memory module, the second response signals denoting the second pre-installed memory module is going to conduct the bus transaction asynchronously;

the third circuitry is further used for detecting the conditionally generated second response signal for a bus transaction, and in response monitoring for third response signals of the bus transaction, in lieu of dynamically determining a time value in terms of the first operating clock for the bus transaction, whenever the third circuitry detects the second response signals for the bus transaction, the third response signals denoting the second pre-installed memory module is ready to complete the bus transaction;

the apparatus further comprises seventh circuitry disposed in the second pre-installed memory module and coupled to the bus for conditionally latching write data off the bus for a bus transaction, responsive to the bus transaction's request signals, referencing the independent second operating clock, whenever the bus transaction's request signals denote a memory write bus transaction, and the bus transaction's request signals address the second pre-installed memory module;

the sixth circuitry is further used for conditionally outputting the third response signals onto the bus for a bus transaction, referencing the independent second operating clock, whenever the sixth circuitry has previously output the second response signals for the bus transaction, and the seventh circuitry has subsequently latched the write data off the bus for the bus transaction;

the first circuitry is further used for concluding each bus transaction signals whose request signals solicited the second response signals instead, upon detection of the third response signals for the bus transaction by the third circuitry, and in like manner, when concluding each bus transaction whose request signals, in addition to having solicited the second response signals, further denote a memory write bus transaction, the fourth circuitry also ceases to maintain the write data on the bus in substantially the same time the first circuitry ceases to maintain the request signals for the bus transaction.

6. In a computer system comprising a processor module including a processor and having a first operating clock, a memory subsystem including a number of pre-installed memory modules and having a second operating clock independent of the first operating clock, a bus coupling the processor module and the memory subsystem to each other, a method for sequentially conducting a plurality of bus transactions between the processor and the memory modules, the method comprising the steps of:

a) initiating and facilitating each bus transaction by the processor module by generating and maintaining request signals, request signals on the bus for each bus transaction, one transaction at a time, referencing the first operating clock;

b) conditionally outputting first response signals onto the bus for a bus transaction by the first pre-installed memory module, responsive to the bus transaction's request signals, referencing the second operating clock, whenever the bus transaction's request signals address the first pre-installed memory module, the first response signals conveying access characteristic information about a first pre-installed memory module of the memory subsystem;

c) conditionally determining a time value in terms of the first operating clock for a bus transaction by the processor, referencing the first operating clock, whenever the request signals solicited the first response signals conveying access characteristic information, the first operating clock based time value being determined dynamically using the responsive access characteristic information and denoting an amount of time in terms of the first operating clock the processor is to wait before concluding the first bus transaction; and d) concluding by the processor each bus transaction whose request signals solicited the first response signals, by ceasing to maintain the request signals of the bus transaction on the bus, after having so waited accordingly.

7. The method as set forth in claim 6, wherein, the method further comprises the steps of:

(e) conditionally outputting and maintaining response data onto the bus for a bus transaction by the first pre-installed memory module, responsive to the bus transaction's request signals, referencing the independent second operating clock, whenever the bus transaction's request signals denote a memory read bus transaction, and the bus transactions' request signals address the first pre-installed memory module, (f) conditionally latching response data off the bus for a bus transaction by the processor, referencing the first operating clock, whenever the bus transaction's request signals denote a memory read bus transaction, a first operating clock based time value has been dynamically determined for the bus transaction, and time has elapsed by the first operating clock based time value determined since the bus transaction was initiated; and when concluding each bus transaction whose request signals, in addition to having solicited the first response signals, further denote a memory read bus transaction, step (d) further comprises allowing time in terms of the first operating clock by the processor for the response data of the bus transaction to be latched, and ceasing to maintain the response data on the bus by the first pre-installed memory module responsive to the cessation of the request signals of the bus transaction.

8. The method as set forth in claim 7, wherein, step (b) further comprises conditionally outputting second response signals onto the bus for a bus transaction by a second pre-installed memory module, responsive to the bus transaction's request signals, referencing the second operating clock of the memory subsystem, whenever the bus transaction's request signals address the second pre-installed memory module, the second response signals denoting the second pre-installed memory module is going to conduct the bus transaction asynchronously;

step (c) further comprises detecting for the conditionally generated second response signals for a bus transaction, and in response monitoring for third response signals of the bus transaction, in lieu of dynamically determining a time value in terms of the first operating clock for the bus transaction, whenever the second response signals for the bus transaction are detected, the third response signals denoting the second pre-installed memory module is ready to complete the bus transaction;

step (e) further comprises conditionally outputting the third response signals onto the bus for a bus transaction by the second pre-installed memory module, referencing the independent second operating clock, whenever the second response signals for the bus transaction have been previously output, and the response data has been output onto the bus for the bus transaction;

step (f) further comprises conditionally latching response data off the bus for a bus transaction by the processor, referencing the first operating clock, whenever the bus transaction's request signals denote a memory read bus transaction, and the second response signals were first detected and followed by subsequent detection of the third response signals for the bus transaction; and step (d) further comprises concluding by the processor each bus transaction whose request signals solicited the second response signals instead, upon detecting the third response signals, and in like manner, when concluding each bus transaction whose request signals, in addition to having solicited the second response signals, further denote a memory read bus transaction, step (d) further comprises allowing time in terms of the first operating clock by the processor for the response data of the bus transaction to be latched, before ceasing to maintain the bus transaction's request signals on the bus, and ceasing to maintain the response data on the bus by the second memory unit responsive to the cessation of the request signals of the bus transaction.

9. The method as set forth in claim 6, wherein the method further comprises the steps of:

(e) conditionally generating and maintaining write data onto the bus for a bus transaction by a processor, in substantially the same time as the bus transaction's request signals are generated and maintained by the processor, referencing the first operating clock, whenever the bus transaction's request signals denote a memory write bus transaction;

(f) conditionally latching write data off the bus for a bus transaction by the first pre-installed memory module, responsive to the bus transaction's request signals, referencing the independent second operating clock, whenever the bus transaction's request signals denote a memory write bus transaction, and the bus transaction's request signals address the first pre-installed memory module; and when concluding each bus transaction whose request signals, in addition to having solicited the first response signals, further denote a memory write bus transaction, step (d) further comprises ceasing by the processor to maintain the write data for the bus transaction in substantially the same time the processor ceases to maintain the request signals for the bus transaction.

10. The method as set forth in claim 6, wherein step (b) further comprises conditionally outputting second response signals onto the bus for a bus transaction by a second pre-installed memory module, responsive to the bus transaction's request signals, referencing the second operating clock of the memory subsystem, whenever the bus transaction's request signals address the second pre-installed memory module, the second response signals denoting the second pre-installed memory module is going to conduct the bus transaction asynchronously;

step (c) further comprises monitoring for the second response signals for a bus transaction by the processor, and in response to detecting the second response signals, monitoring for third response signals of the bus transaction, in lieu of dynamically determining a time value in terms of the first operating clock for the bus transaction, whenever the second response signals for the bus transaction are detected, the third response signals denoting the second pre-installed memory module is ready to complete the bus transaction;

step (f) further comprises conditionally latching write data off the bus and then outputting the third response signals onto the bus for a bus transaction by the second pre-installed memory module, responsive to the bus transaction's request signals, referencing the independent second operating clock, whenever the bus transaction's request signals denote a memory write bus transaction, and the bus transaction's request signals address the second pre-installed memory module; and step (d) further comprises concluding by the processor each bus transaction whose request signals solicited the second response signals instead, upon detecting the third response signals, and in like manner, when concluding each bus transaction whose request signals, in addition to having solicited the second response signals, further denote a memory write bus transaction, step (d) further comprises ceasing by the processor to maintain the write data for the bus transaction in substantially the same time the processor ceases to maintain the request signals for the bus transaction.

* * * * *